(12) United States Patent
Yanagida et al.

(10) Patent No.: US 11,098,658 B2
(45) Date of Patent: Aug. 24, 2021

(54) PLATE AND METHOD FOR MANUFACTURING PLATE

(71) Applicant: DENSO CORPORATION, Kariya (JP)

(72) Inventors: Etsugo Yanagida, Kariya (JP); Tetsuji Yamanaka, Kariya (JP); Naoaki Kono, Kariya (JP)

(73) Assignee: DENSO CORPORATION, Kariya (JP)

( * ) Notice: Subject to any disclaimer, the term of this patent is extended or adjusted under 35 U.S.C. 154(b) by 152 days.

(21) Appl. No.: 16/354,351

(22) Filed: Mar. 15, 2019

(65) Prior Publication Data

US 2019/0211752 A1 Jul. 11, 2019

Related U.S. Application Data

(63) Continuation of application No. PCT/JP2018/005434, filed on Feb. 16, 2018.

(30) Foreign Application Priority Data

Mar. 1, 2017 (JP) .............................. JP2017-37851

(51) Int. Cl.
| | |
|---|---|
| *F02C 9/18* | (2006.01) |
| *F02C 3/00* | (2006.01) |
| *F01D 17/10* | (2006.01) |
| *F02C 6/12* | (2006.01) |

(Continued)

(52) U.S. Cl.
CPC .............. *F02C 9/18* (2013.01); *F01D 17/105* (2013.01); *F02B 37/18* (2013.01); *F02B 39/00* (2013.01); *F02C 3/00* (2013.01); *F02C 6/12* (2013.01); *F05D 2220/40* (2013.01); *F05D 2230/24* (2013.01); *F05D 2270/021* (2013.01); *Y02T 10/12* (2013.01)

(58) Field of Classification Search
CPC ...... F02C 9/18; F02C 6/12; F02C 3/00; F01D 17/105; F02B 37/18; F02B 37/183; F02B 37/186; F05D 2220/40; F05D 2270/021; F05D 2230/24
See application file for complete search history.

(56) References Cited

U.S. PATENT DOCUMENTS

| 2,150,708 | A | * | 3/1939 | Andrews | ................ | B21D 22/28 72/338 |
| 10,787,957 | B2 | * | 9/2020 | Nakajima | ............. | F02B 37/186 |
| 2011/0139278 | A1 | | 6/2011 | Kawajiri et al. | | |

(Continued)

FOREIGN PATENT DOCUMENTS

| JP | 2016-70260 | | 5/2016 | | |
| WO | 2013/042172 | | 3/2013 | | |
| WO | WO-2016203736 | A1 * | 12/2016 | .............. | F02B 37/18 |

*Primary Examiner* — Richard A Edgar
(74) *Attorney, Agent, or Firm* — Nixon & Vanderhye P.C.

(57) ABSTRACT

A turbocharger includes a wastegate valve, an actuator for the wastegate valve, and a link mechanism linking the wastegate valve with the actuator via a specific rod. A plate is a component of the link mechanism and connects the wastegate valve with the rod or connects the rod with the actuator. The plate includes a body portion in a plate shape and a pin portion protruding from the main body portion. The pin portion is in a tubular shape having a hollow portion opened to its outside. The pin portion is engageable with an other component of the link mechanism on its outer periphery to form a rotation axis of the other component.

18 Claims, 10 Drawing Sheets

(51) Int. Cl.
 *F02B 39/00* (2006.01)
 *F02B 37/18* (2006.01)

(56) References Cited

U.S. PATENT DOCUMENTS

| | | |
|---|---|---|
| 2013/0255250 A1 | 10/2013 | Naunheim et al. |
| 2015/0118027 A1* | 4/2015 | Zieboli ................ F01D 17/105 415/145 |
| 2016/0003135 A1 | 1/2016 | Jaegle et al. |
| 2016/0169093 A1 | 6/2016 | Keller |

* cited by examiner (a)

(b)

(a)

(b)

(c)

(a)

(b)

(c)

(d)

PLATE AND METHOD FOR MANUFACTURING PLATE

CROSS REFERENCE TO RELATED APPLICATION

The present application is a continuation application of International Patent Application No. PCT/JP2018/005434 filed on Feb. 16, 2018, which designated the U.S. and claims the benefit of priority from Japanese Patent Application No. 2017-37851 filed on Mar. 1, 2017. The entire disclosures of all of the above applications are incorporated herein by reference.

TECHNICAL FIELD

The present disclosure relates to a plate for driving a wastegate valve of a turbocharger. The present disclosure relates further to a method for manufacturing the plate.

BACKGROUND

A wastegate valve is conventionally used for a turbocharger in a turbocharged internal combustion engine to divert exhaust gas from a turbine wheel of the turbocharger to regulate rotational speed of the turbine wheel.

SUMMARY

According to one aspect of the present disclosure, a link mechanism includes a plate-shaped component pivotally linking an actuator with a wastegate valve via a rod.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
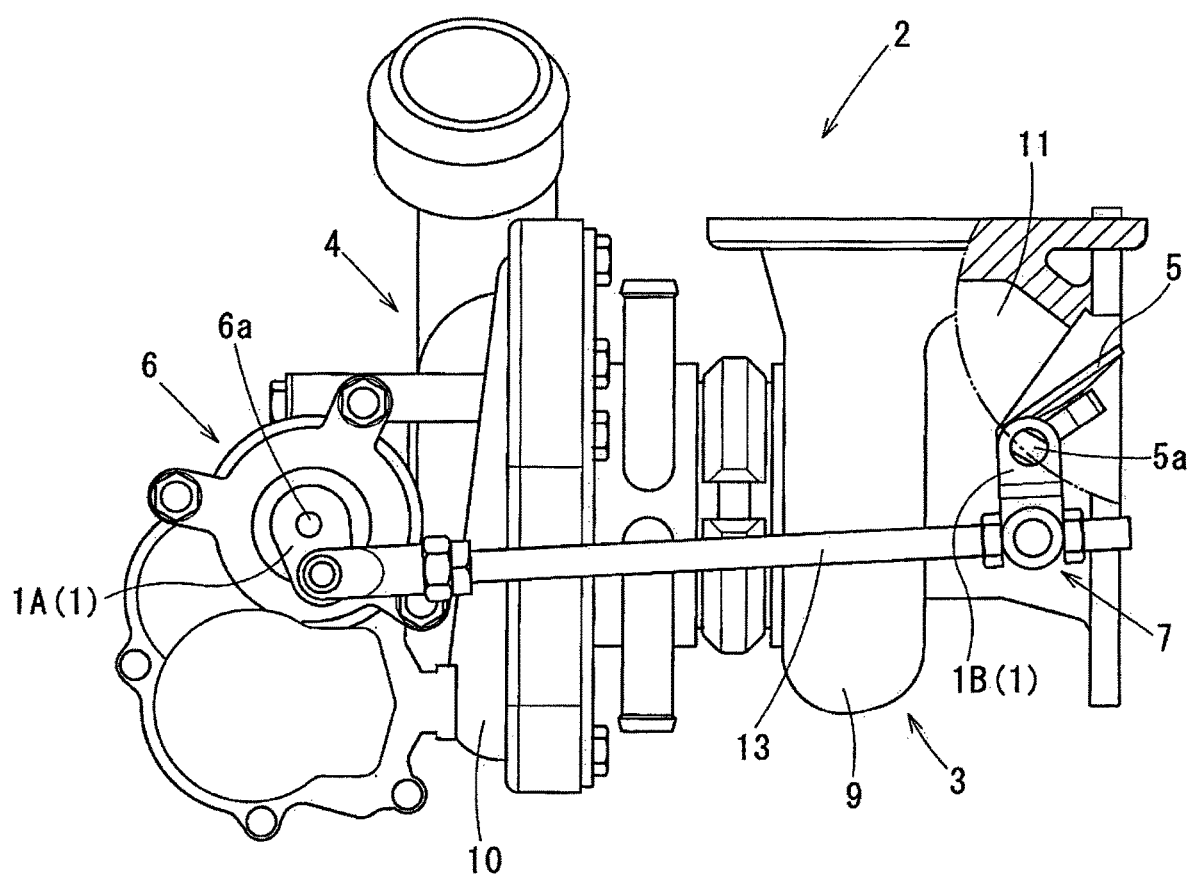
FIG. 1 is an overview showing a turbocharger according to at least one of embodiments.
Figure 2:
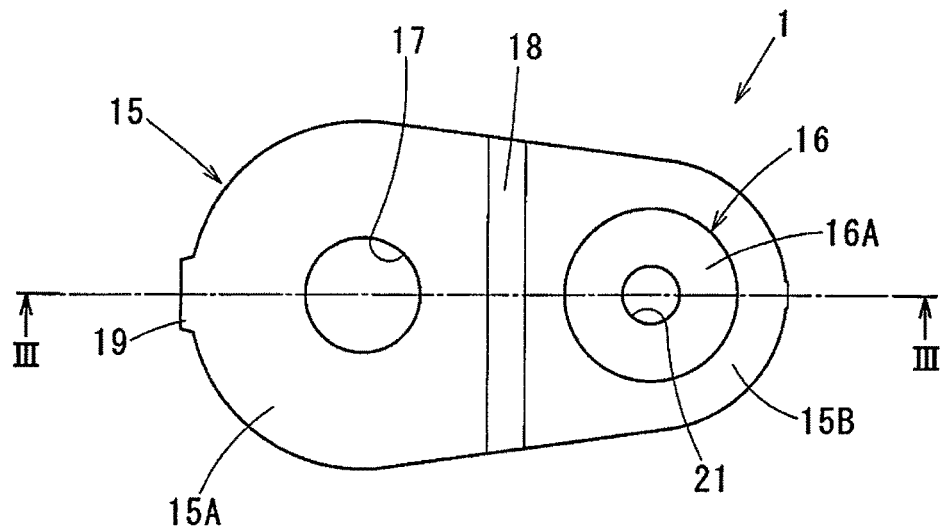
FIG. 2 is a plan view showing a plate according to at least one of embodiments.
Figure 3:
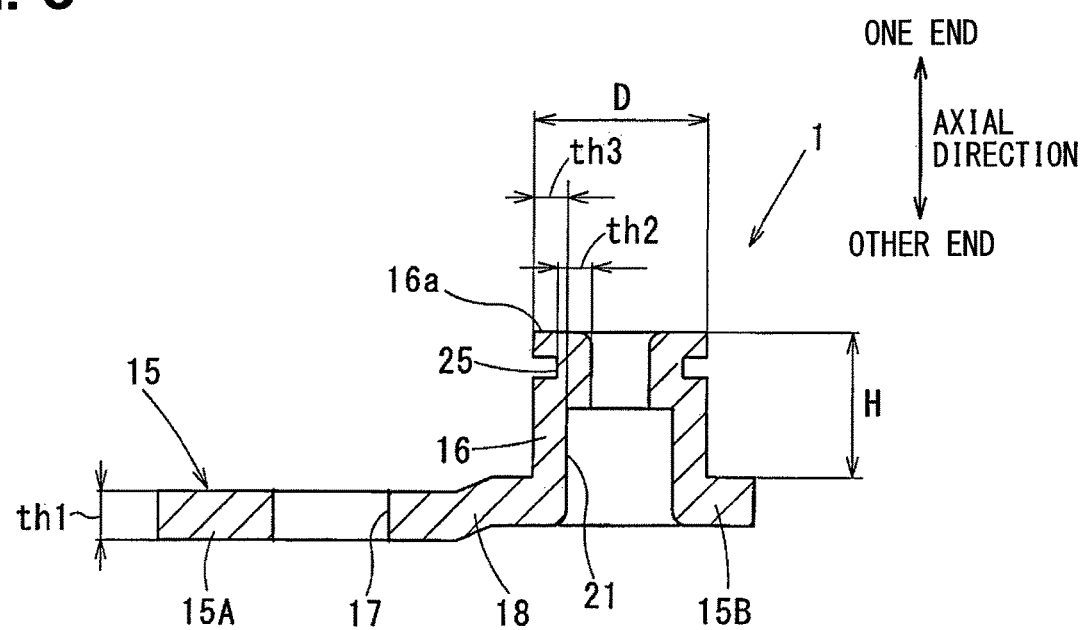
FIG. 3 is a cross-sectional view taken along a line III-III in FIG. 2.
Figure 4:
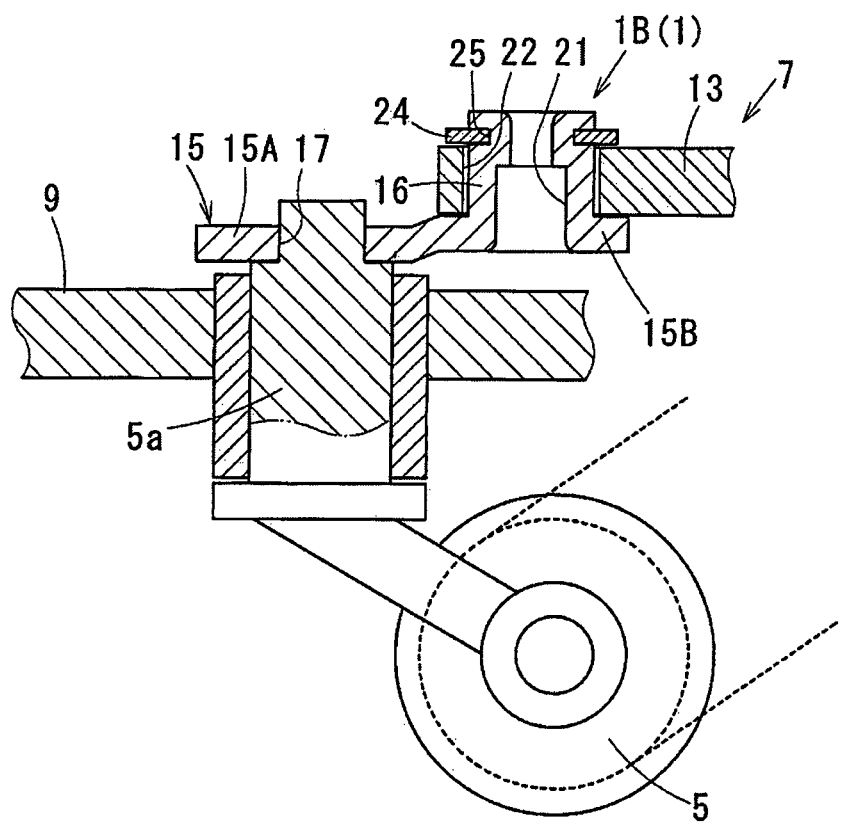
FIG. 4 includes (a), which is a cross-sectional view showing a state where a rod and a waste gate valve are assembled to a plate, and (b), which is a plan view showing a state where the plate and a rod are assembled together, according to at least one of embodiments.
Figure 4:
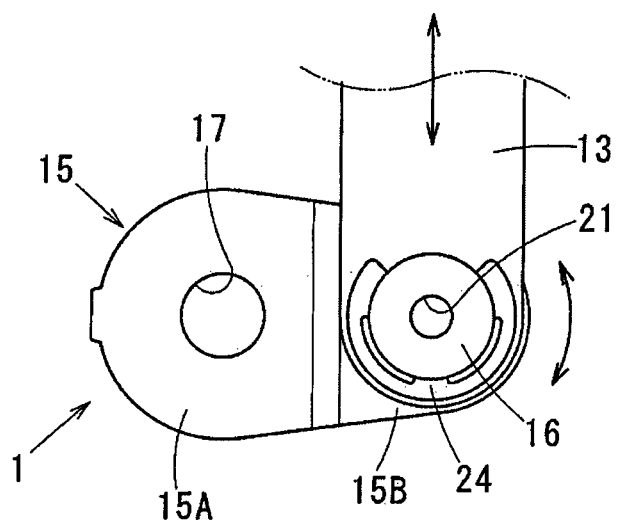
Figure 5:
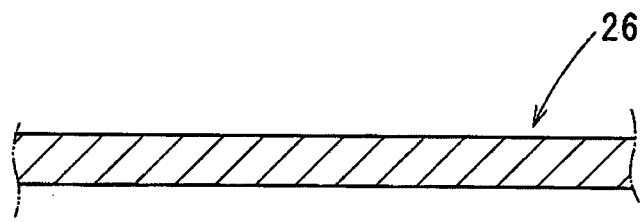
FIG. 5 includes (a), which is a cross-sectional view showing a plate-like metallic material, (b), which is a cross sectional view showing an integrated component as an intermediate material, and (c) is a cross-sectional view showing the plate as an end product, according to at least one of embodiments.
Figure 5:
Figure 5:
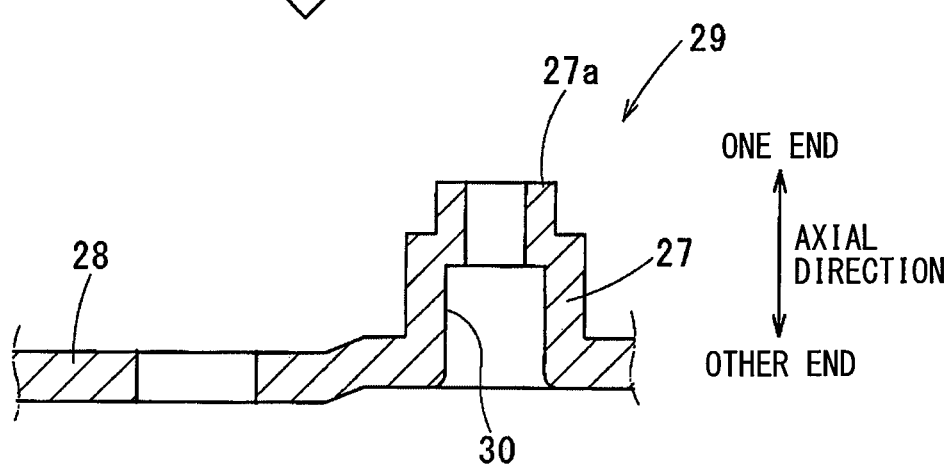
Figure 5:
Figure 5:
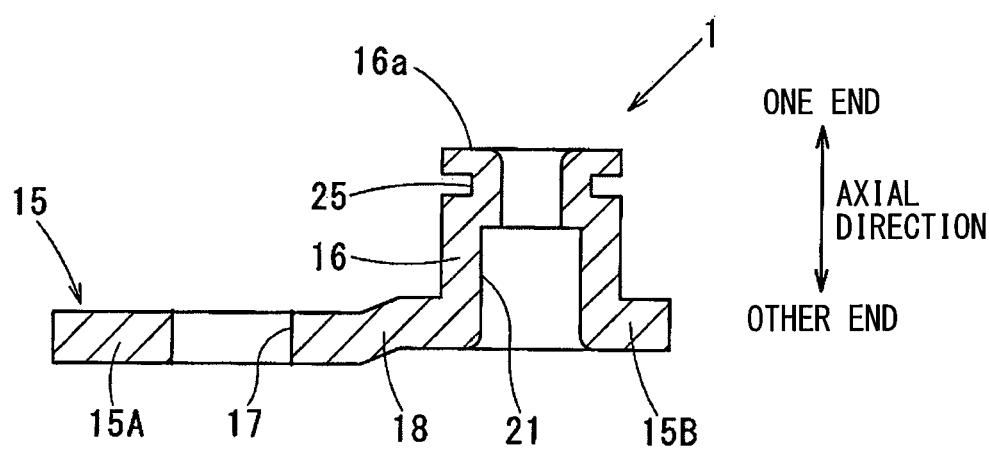

According to an example of the present disclosure, a turbocharger for an internal combustion engine includes a wastegate valve, an actuator, and a link mechanism. The wastegate valve has a swing-type structure configured to rotate to manipulate an opening of a passage diverted from an exhaust passage. The actuator is configured to drive the wastegate valve. The link mechanism links the wastegate valve with the actuator via a specific rod. The turbine of the turbocharger is presumably exposed to exhaust gas at high temperature from of the internal combustion engine.

The turbocharger having such a configuration could form a heat transfer path extending from the turbine to the actuator via the link mechanism. Consequently, heat of the turbine could be transmitted to the actuator through the heat transfer path. The transmission of heat from the turbine to the link mechanism could be hardly avoidable.

One conceivable structure of the turbocharger is to promote dissipation of heat to air from the heat transfer path between the turbine and the actuator thereby to suppress the transmission of heat to the actuator. The conceivable structure would promote release of heat from the heat transfer path to air thereby to suppress transmission of heat of the turbine to the actuator via the link mechanism.

According to one aspect of the present disclosure, a turbocharger includes a swing-type wastegate valve, an actuator for the wastegate valve, and a link mechanism. The swing-type wastegate valve is configured to be driven to rotate. The actuator is for the wastegate valve. The link mechanism links the wastegate valve with the actuator via a specific rod. The plate is a component of the link mechanism for the turbocharger. The plate is at least a part of a portion between the wastegate valve and the rod or a portion between the rod and the actuator.

The plate includes a main body portion and a pin portion. The main body portion is in a plate-like shape. The pin portion protrudes from the main body portion and forms a rotation axis of the rod. The pin portion is in a tubular shape having a hollow portion opening to an outside. The pin portion is engageable with another component of the link mechanism on its outer periphery and forms a rotation axis of the other component.

This configuration with the hollow portion formed in the pin portion enables to increase a heat dissipation area to ambient air from the pin portion, which is a component of the link mechanism. In addition, the pin portion formed in the tubular shape enables to reduce the cross-sectional area of the pin portion thereby to enable to suppress heat transfer at the pin portion itself.

Thus, the configuration enables to suppress transmission of heat in the pin portion toward the actuator and to promote heat radiation from the hollow portion. In this way, the configuration promotes release of heat to the ambient air from the heat transfer path extending from the turbine to the actuator in the turbocharger. Therefore, the configuration enables to suppress transmission of heat of the turbine to the actuator via the link mechanism.

As follows, embodiments for implementing the present disclosure will be described.

Configuration of an Embodiment

The configuration of a plate 1 of the embodiment will be described with reference to the drawings.

First, a turbocharger 2 using the plate 1 will be described.

For example, referring to FIG. 1, the turbocharger 2 supercharges intake air into an internal combustion engine (not shown) by utilizing a kinetic energy of exhaust gas of the internal combustion engine. The turbocharger 2 includes an exhaust turbine 3, an intake compressor 4, a waste gate valve 5, an actuator 6, and a link mechanism 7.

The exhaust turbine 3 has a general structure including a turbine wheel (not shown), which is rotational by utilizing the kinetic energy of exhaust gas, and a turbine housing 9, which is in a spiral shape and accommodates the turbine wheel. The exhaust turbine 3 is placed in an exhaust passage (not shown) of the internal combustion engine and is driven to rotate by utilizing the kinetic energy of exhaust gas.

The intake compressor 4 has a general structure including a compressor wheel (not shown), which is rotational by application of a torque of the turbine wheel, and a compressor housing 10, which is in a spiral shape and accommodates the compressor wheel. The intake compressor 4 is placed in an intake passage (not shown) of the internal combustion engine to compress intake air by utilizing the torque of the turbine wheel.

The wastegate valve 5 is a swing type valve that is driven to rotate. The wastegate valve 5 is placed in a bypass passage 11 that partly branches a flow of exhaust gas in the exhaust passage to bypass the exhaust turbine 3. The wastegate valve 5 is rotationally driven by a torque generated by using the actuator 6 to adjust an opening degree of the bypass passage 11 and adjusts a supercharging pressure generated by using the turbocharger 2. Hereinafter, the wastegate valve 5 may be referred to as a valve 5 briefly.

The actuator 6 is a torque generator for outputting torque and has a general structure including, for example, an electric motor (not shown), a gear reducer (not shown), and an output shaft 6a. The actuator 6 is equipped to the intake air compressor 4, which is distant from the exhaust turbine 3 and the valve 5, in order to suppress thermal influence exerted by exhaust gas.

The link mechanism 7 mechanically links the actuator 6, which is provided to the intake compressor 4, and the valve 5, which is provided to the exhaust turbine 3, via a rod 13. The link mechanism 7 includes two of the plates 1.

The link mechanism 7 of the embodiment includes the two plates 1 and the rod 13. One of the plates 1A is affixed to an output shaft 6a of the actuator 6. The other of the plates 1B is affixed to a rotation shaft 5a of the valve 5. The rod 13 transmits a torque, which is applied to the plate 1A, to the plate 1B to rotate the valve 5.

The plate 1 will be described in detail with reference to FIGS. 2 to 5.

The plate 1 includes a main body portion 15 and a pin portion 16. The main body portion 15 is in a plate-like shape.

The pin portion 16 protrudes from the main body portion 15 and forms a rotation axis of the rod 13. The material of the plate 1 is, for example, SUS 430. The entirety of the plate 1 is subjected to high-temperature nitriding treatment.

The main body portion 15 is a portion defining a turning radius of the plate 1. The main body portion 15 has a hole 17 as described below. Specifically, the hole 17 has an axis parallel to an axis of the pin portion 16. The rotation axis 5a of the valve 5 or the output shaft 6a of the actuator 6 is fitted to the hole 17. The hole 17 is in a circular shape.

The main body portion 15 has a bending step 18 at which a portion 15A where the hole 17 resides and the portion 15B where the pin portion 16 resides are shifted to each other.

The portion 15A has a progressive matching 19 residing on a straight line connecting the axis of the pin portion 16 with the axis of the hole 17.

The pin portion 16 is raised vertically from the portion 15B. That is, an axial direction of the pin portion 16 is perpendicular to the portion 15B.

The pin portion 16 is in a tubular shape and has a hollow portion 21 opened to its outside. A rod 13 is engaged with the outer periphery of the pin portion 16. That is, the rod 13 has a hole 22 through which the pin portion 16 is inserted. The rod portion 13 and the pin portion 16 are engaged with each other by inserting the pin portion 16 through the hole 22 (refer to (a) and (b) in FIG. 4).

A hollow portion 21 extends throughout the pin portion 16. The hollow portion 21 is opened to the outside on a tip end side of the pin portion 16 and on a main body side where the main body portion 15 resides. A groove 25 resides on an outer periphery of the pin portion 16. A component 24 is engageable to the groove 25 for avoiding detachment of the rod 13. The hollow portion 21 extends throughout the pin portion 16 and is open to the outside on both the one end side and the other end side in the axial direction of the pin portion 16. The hollow portion 21 also resides on the radially inside of the groove 25. The component 24 is, for example, an E ring or a clip. In the following description, the tip end side and the main body side may be referred to as the one end side and the other end side, respectively, in the axial direction of the pin portion 16.

A thickness th1 of the main body portion 15 is larger than a thicknesses th2 and a thicknesses th3 of the pin portion 16.

The thickness th2 is a thickness of a portion of the pin portion 16 having the groove portion 25. The thickness th3 is a thickness of a portion of the pin portion 16 where the rod 13 is fitted, that is, a wall portion of the pin portion 16.

The thickness th2 is the same as the thickness th3. A diameter D of a portion (wall portion of the pin portion 16) where the rod 13 is fitted is larger than a height H of entirety of the pin portion 16.

The plate 1 is formed by drawing a singular plate-like metallic material 26. The main body portion 15 and the pin portion 16 are continuous to each other without a gap and an interface. That is, the body portion 15 and the pin portion 16 are not a joined body, which is formed by joining or press-fitting separate components to each other, but are an integral piece, which is formed of a single and serial material not to raise a gap and an interface therebetween. In other words, the body portion 15 and the pin portion 16 are made of a continuous material and are formed as one piece.

Method for Manufacturing of the Embodiment

A method for manufacturing the plate 1 will be described.

To begin with, according to the method for manufacturing the plate 1, a singular metallic material 26 in a platelike form is first prepared by press working or the like in a preparation step. Subsequently, the metallic material 26 is subjected to a drawing process to form an unitary body 29 in a subsequent drawing process (refer to FIG. 5). The unitary body 29 includes the tubular portion 27 and the flat plate portion 28, which are continuously formed not to raise a gap or an interface. The tubular portion 27 corresponds to the pin portion 16. The flat plate portion 28 corresponds to the main body portion 15.

Herein, the tubular portion 27 includes a hollow portion 30, which opens on both sides in the axial direction. The hollow portion 30 is to become the hollow portion 21 of the pin portion 16. The tip end portion 27a of the tubular portion 27 is reduced stepwise in diameter. The hollow portion 30 is also reduced in diameter at the tip end side according to a degree of reduction in diameter at the tip end portion 27a.

Subsequently, the tip portion 27a is pressed and bent, i.e., the tip portion 27a is forged to form the groove 25.

Effect of Embodiment

In the plate 1 according to the embodiment, the pin portion 16 is in the tubular shape and has the hollow portion 21 opened to its outside. The rod 13 is engaged with the outer periphery of the pin portion 16.

The present configuration with the hollow portion 21 formed in the pin portion 16 enables to increase a heat dissipation area to the ambient air through a heat transfer path from the exhaust turbine 3 to the actuator 6.

In addition, the pin portion 16 formed in the tubular shape enables to reduce the cross-sectional area of the pin portion 16. Therefore, the present configuration enables to suppress heat transfer at the pin portion 16 itself. Thus, the configuration enables to suppress transmission of heat in the pin portion 16 to the actuator 6 and to promote heat radiation from the hollow portion 21.

In this way, the configuration promotes release of heat to the ambient air from the heat transfer path extending from the exhaust turbine 3 to the actuator 6 in the turbocharger 2. Therefore, the configuration enables to suppress transmission of heat of the exhaust turbine 3 to the actuator 6 via the link mechanism 7.

Therefore, slidability between the plate 1 and the rod 13 and ablation resistance of the plate 1 and the rod 13 can be enhanced. Specifically, in a case where the pin portion 16 is a solid object, heat dissipation is reduced at the pin portion 16, and ablation caused by sliding motion increases in a high temperature environment. To the contrary, in the configuration where the hollow portion 21 is formed in the pin portion 16 to enhance heat dissipation at the pin portion 16, slidability and abrasion resistance can be enhanced even under a high temperature environment. The method, which is to prepare the metal material 26 by subjecting the press working and to subject the drawing process on the metal material 26, is employed in order to form the hollow portion 21 in the pin portion 16. The method enables to form the plate 1 without forging.

The main body portion 15 and the pin portion 16 are continuous so that no gap and interface resides.

The configuration enables to enhance heat transfer between the main body portion 15 and the pin portion 16. In this way, the configuration promotes heat transfer from the exhaust turbine 3 to the pin portion 16 via the main body portion 15 in the plate 1B and enables to enhance heat radiation from the hollow portion 21.

The body portion 15 and the pin portion 16 are not a joined body, which is formed by joining or press-fitting separate components to each other, but are an integral piece, which is formed of a single and serial material not to raise a gap and an interface therebetween. Therefore, the configuration facilitates its heat treatment.

Specifically, in a situation where separate components, which have been subjected to a heat treatment to have a hard structure, are joined together by crimping or the like, cracking would occur in the components. In addition, in a situation where the separate components, which have been crimped together, are subjected to a heat treatment, those metallic material is exposed in a high temperature state. Consequently, its crimping force may be possibly relaxed. To the contrary, the body portion 15 and the pin portion 16 are integrally formed not to raise an interface, thereby to render crimping or the like unnecessary after those heat treatment. In this way, the heat treatment can be facilitated.

In addition, the main body portion 15 and the pin portion 16 are continuous to each other without a gap and an interface. Therefore, the configuration does not require a connecting process or the like and enables to reduce those manufacturing cost.

The hollow portion 21 extends throughout the pin portion 16 and is opened to the outside at the two portions.

The configuration enables traveling wind caused to pass through the hollow portion 21, thereby to enhance heat radiation at the pin portion 16.

The thickness th1 of the main body portion 15 is larger than the thicknesses th2 and the thicknesses th3 of the pin portion 16.

The rod 13 exerts a force on the pin portion 16 in its compression direction. Therefore, a stress arising in the pin portion 16 is small. To the contrary, the force exerted on the pin portion 16 is transmitted to cause a bending moment in the main body portion 15. Therefore, a stress arising in the main body portion 15 is large. For this reason, the thickness th1 of the main body portion 15 is required to be larger than the thicknesses th2 and the thicknesses th3 of the pin portion 16.

In addition, the pin portion 16 is in the tubular shape, and therefore, its section modulus is large and the stress arising therein is small. To the contrary, the body section 15 has a small section modulus. Therefore, a large stress arises in the body section 15 to the bending exerted thereon. For this reason, the thickness th1 of the main body portion 15 is required to be larger than the thicknesses th2 and the thicknesses th3 of the pin portion 16.

As described above, the thickness th1 of the main body portion 15 is set to be larger than the thicknesses th2 and the thicknesses th3 of the pin portion 16, thereby to enable to enhance a rigidity of the main body portion 15.

The groove 25 resides on the outer periphery of the pin portion 16. A component 24 is engageable to the groove 25 for avoiding detachment of the rod 13.

The configuration enables the component 24 to reliably restrict the rod 13 from detachment.

The hollow portion 21 resides also on the radially inside of the groove 25. The thickness th2 of the portion of the pin portion 16, where the groove 25 resides, is the same as the thickness th3 of the portion of the pin portion 16 where the rod 13 is fitted.

First, the surface area of the hollow portion 21 is increased by rendering the hollow portion 21 residing also in the radially inside of the groove 25, thereby to enable to enhance its heat radiation performance. In addition, the thickness th2 and the thickness th3 are set to be the same as each other, thereby to reduce a portion of the plate 1 where its thickness is large. In this way, the configuration enables to render the plate 1 in more suitable shape for the press working.

The entirety of the plate 1 is subjected to the heat treatment or to a surface treatment.

Under a high temperature environment of the turbocharger 2, the plate 1 and the rod 13 are required to slide with each other without lubrication therebetween. In addition, the configuration is also subjected to a high surface pressure during the sliding motion therebetween. Therefore, the entirety of the plate 1 is subjected to the heat treatment or the surface treatment to harden the pin portion 16, thereby to enable to increase its durability against the high surface pressure in the non-lubricating sliding motion under the high temperature environment.

The body portion 15 has the hole 17 to which the rotary shaft 5a of the valve 5 or the output shaft 6a of the actuator 6 is engageable. The axis of the hole 17 is parallel to the axis of the pin portion 16.

The configuration enables to transmit the torque generated by the actuator 6 to the valve 5 by engaging the rotation shaft 5a of the valve 5 or the output shaft 6a of the actuator 6 to the hole 17 to connect therebetween.

The progressive matching 19 resides on the straight line connecting the axis of the pin portion 16 with the axis of the hole 17.

The configuration enables to suppress inclination in the drawing process.

The hole 17 is in the circular shape.

The configuration enables to avoid stress concentration during the pressing work to form the hole 17, thereby to suppress occurrence of sag in the opening edge of the hole 17. Thus, the configuration enables to reduce variations in dimensions.

The main body portion 15 has the bending step 18.

The configuration enables to enhance a degree of freedom in placement of the plate 1.

The diameter D of the portion of the pin portion 16, to which the rod 13 is fitted, is larger than the height H of entirety of the pin portion 16.

The configuration enables the pin portion 16 to increase its surface area while suppressing its height H, thereby to enhance its heat radiation property while suppressing the height H. In addition, the configuration enables to suppress cracking arising during the drawing process by setting the diameter D to be larger than the height H.

The method for manufacturing the plate 1 includes the drawing process. In the drawing process, the metallic material 26 is subjected to the drawing work to form the unitary body 29 to include the tubular portion 27 and the flat plate portion 28, which are continuous not to raise a gap or an interface. The tubular portion 27 corresponds to the pin portion 16. The flat plate portion 28 corresponds to the main body portion 15.

In this way, the main body portion 15 and the pin portion 16 are formed continuous to each other without a gap and an interface therebetween. Therefore, the heat transmission property between the main body portion 15 and the pin portion 16 can be enhanced. In this way, the configuration promotes heat transfer from the exhaust turbine 3 to the pin portion 16 via the main body portion 15 in the plate 1 and enables to enhance heat radiation from the hollow portion 21.

The manufacturing method enables to form the body portion 15 and the pin portion 16 as not a joined body, which is formed by joining or press-fitting separate components to each other, but as the integral piece, which is formed of the single and serial material not to raise a gap and an interface therebetween. Therefore, the manufacturing method facilitates the thermal treatment of the plate 1.

In addition, the main body portion 15 and the pin portion 16 are rendered continuous to each other without a gap and an interface therebetween. Therefore, the manufacturing method does not require a connecting process or the like and enables to reduce those manufacturing cost.

The tubular portion 27 includes the hollow portion 21 which opens on both sides in the axial direction.

The configuration enables to facilitate the drawing work exerted on the pressed body. In addition, the configuration enables to form the groove 25 by bending the tip end side of the tubular portion 27.

The tip end portion 27a of the tubular portion 27 is reduced stepwise in diameter. In the drawing process, the groove 25 is formed by bending the tip end portion 27a.

The step formed in the cylindrical portion 27 enables to enhance an accuracy of the position and size of the groove 25.

Another Embodiment

Description will be made mainly on the difference of the plate 1 according to the present embodiment from the plate 1 according to the above embodiment.

Figure 6:
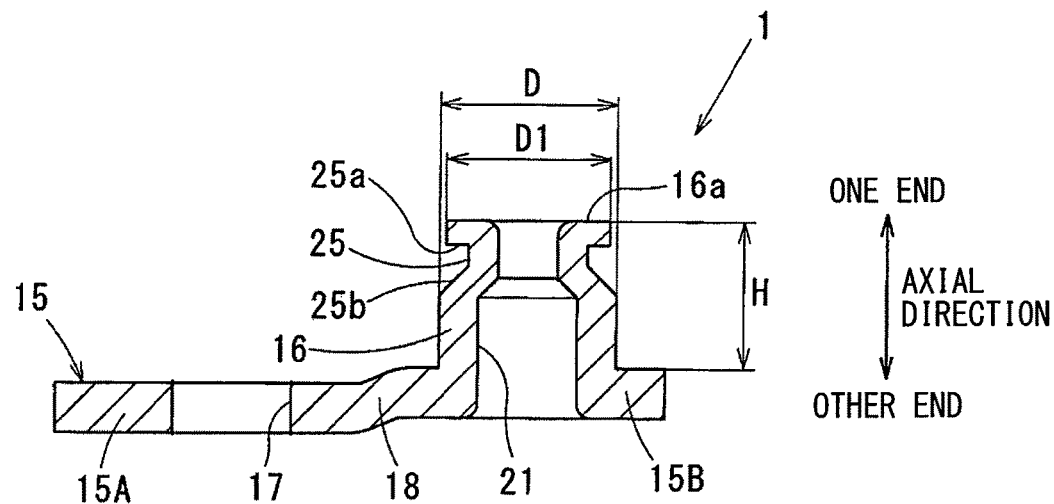
FIG. 6 is a cross-sectional view showing a plate according to at least one of embodiments.

As shown in FIG. 6, in the plate 1 of the second embodiment, two lateral surfaces 25a and 25b reside around the groove 25. The lateral surface 25b on the other side in the axial direction has a tapered surface in which the closer to its radially outer side, the closer to the main body portion 15.

Assuming if the width dimension of the groove 25 is strictly controlled to reduce rattling of the component 24, a situation would arise where the component 24 cannot be fitted to the groove 25. To the contrary, the lateral surface 25b is formed in the tapered surface, thereby to reduce the rattling by causing the component 24, which is fitted to the groove 25, to slip on the tapered surface. Therefore, the configuration enables to suppress rattling of the component 24 while enabling to reliably fit the component 24 to the groove 25.

As for the diameter of the pin portion 16, the diameter D1 of the portion on the one end side in the axial direction with respect to the groove 25 is smaller than the diameter D of the portion on the other side.

The configuration enables to restrict the pin portion 16 from interfering with the peripheral edge of the hole 22 when the pin portion 16 is inserted through the hole portion 22 of the rod 13.

Assuming that if the gap between the pin portion 16 and the peripheral edge of the hole 22 is increased, even if the diameter D1 of the pin portion 16 on the one end side is set to be larger than the diameter D on the other end side, the pin portion 16 can be inserted through the hole 22 while avoiding the interference between the pin portion 16 and the peripheral edge of the hole 22.

However, as the gap between the pin portion 16 and the peripheral edge of the hole 22 becomes larger, the surface pressure at the time of the sliding motion becomes higher. Therefore, the gap between the pin portion 16 and the peripheral edge of the hole 22 is desirably as small as possible. For that reason, the diameter D1 is set to be smaller than the diameter D, thereby to enable to suppress the interference between the pin portion 16 and the peripheral edge of the hole 22 when the pin portion 16 is inserted through the hole portion 22. In addition, the configuration enables to reduce the gap between the pin portion 16 and the peripheral edge of the hole 22 as much as possible, thereby to reduce the surface pressure during the sliding motion.

Another Embodiment

Description will be made mainly on the difference of the plate 1 according to the present embodiment from the plate 1 according to the above embodiment.

Figure 7:
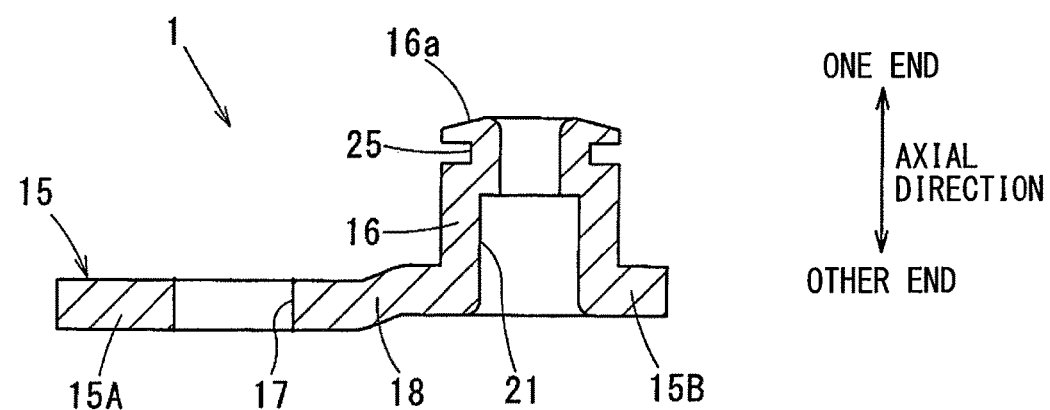
FIG. 7 is a plan view showing a plate according to at least one of embodiments.

As shown in FIG. 7, in the plate 1 of the third embodiment, a tip end surface 16a of the pin portion 16 is in a tapered shape in which the closer to its radially outer side, the closer to the main body portion 15.

The configuration enables to facilitate the work to insert the pin portion 16 through the hole 22 of the rod 13, thereby to facilitate the assembling.

Another Embodiment

Description will be made mainly on the difference of the plate 1 according to the present embodiment from the plate 1 according to the above embodiment.

Figure 8:
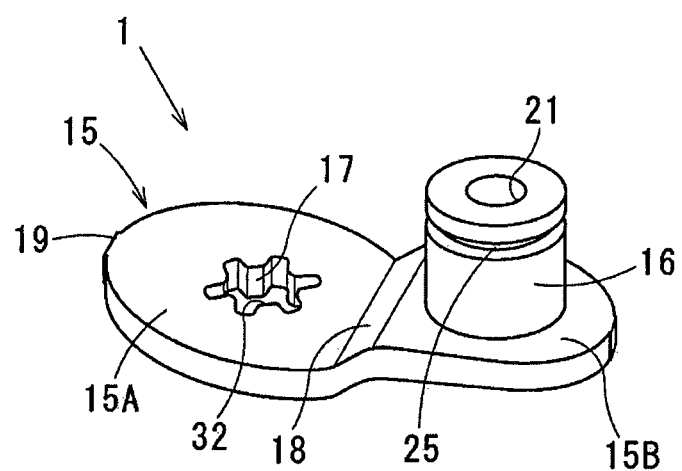
FIG. 8 includes (a), which is a perspective view showing a plate, and (b) to (d), which are plan views each showing a shape of a detent, according to at least one of embodiments.
Figure 8:
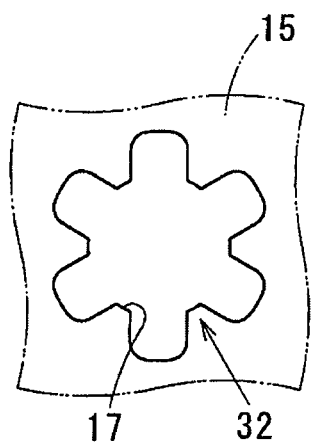
Figure 8:
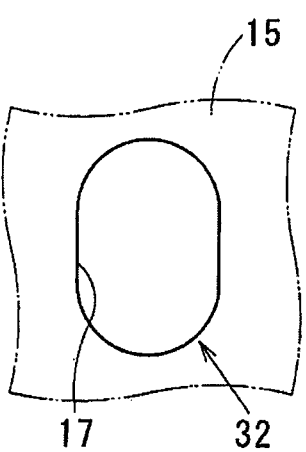
Figure 8:
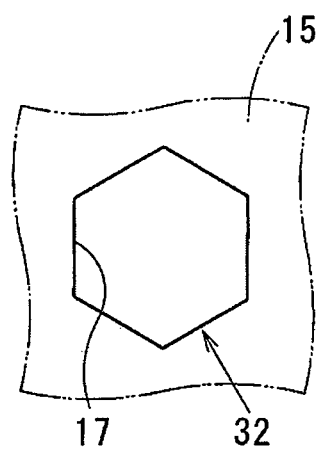

As shown in FIG. 8, the plate 1 of the fourth embodiment has a rotation stopper 32 in the hole 17.

The configuration enables to prevent the output shaft 6a of the actuator 6 or the rotation shaft 5a of the valve 5 from rotating relative to the plate 1. In addition, detachment of the plate 1 can be avoided by crimping the output shaft 6a or the rotation shaft 5a.

The rotation stopper 32 may be in various shapes, such as a flower shape, in which protrusions are extended radially inward (see (a) and (b) in FIG. 8), a rectangular shape, in which two sides are parallel to each other, (see (c) in FIG. 8), or a polygonal shape such as a regular hexagonal shape (see (d) in FIG. 8).

Another Embodiment

Description will be made mainly on the difference of the plate 1 according to the present embodiment from the plate 1 according to the above embodiment.

The plate 1 of the fifth embodiment is a component of a link mechanism 7 in the turbocharger 2 including an actuator 6 such as a diaphragm type actuator similar to that of, for example, JP 2016-523328 A. The plate 1 links the rod 13 with the rotation axis 5a of the valve 5.

Figure 9:
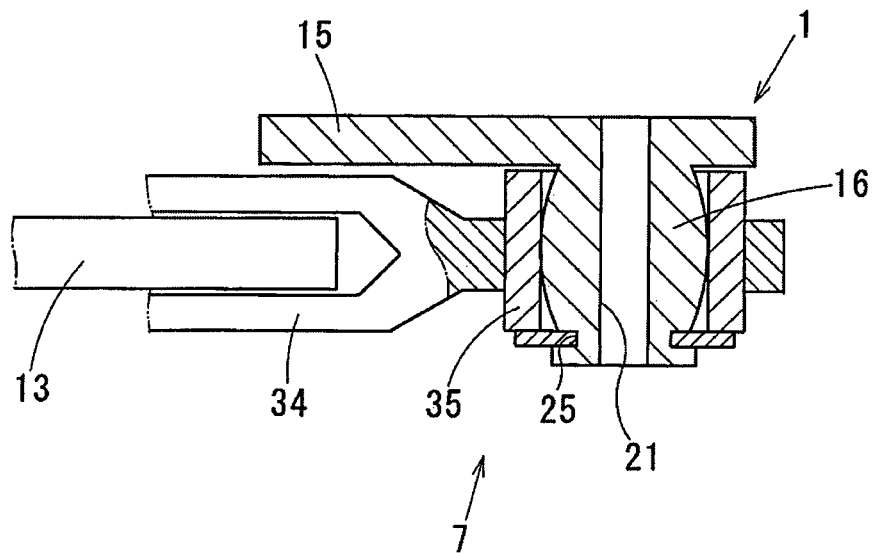
FIG. 9 is a cross-sectional view showing a link between a plate and a rod according to at least one of embodiments.

As shown in FIG. 9, the link mechanism 7 of the fifth embodiment includes a guide piece 34 and a bushing 35 between the rod 13 and the pin portion 16. The guide piece 34 is welded to an end portion of the rod 13. The bushing 35 is press-fitted to the guide piece 34. The pin portion 16 is placed in the bushing 35. The pin portion 16 of the fifth embodiment is a spheroid. The hollow portion 21 is, for example, a tube coaxial with the long axis of the spheroid.

Another Embodiment

Description will be made mainly on the difference of the plate 1 according to the present embodiment from the plate 1 according to the above embodiment.

Figure 10:
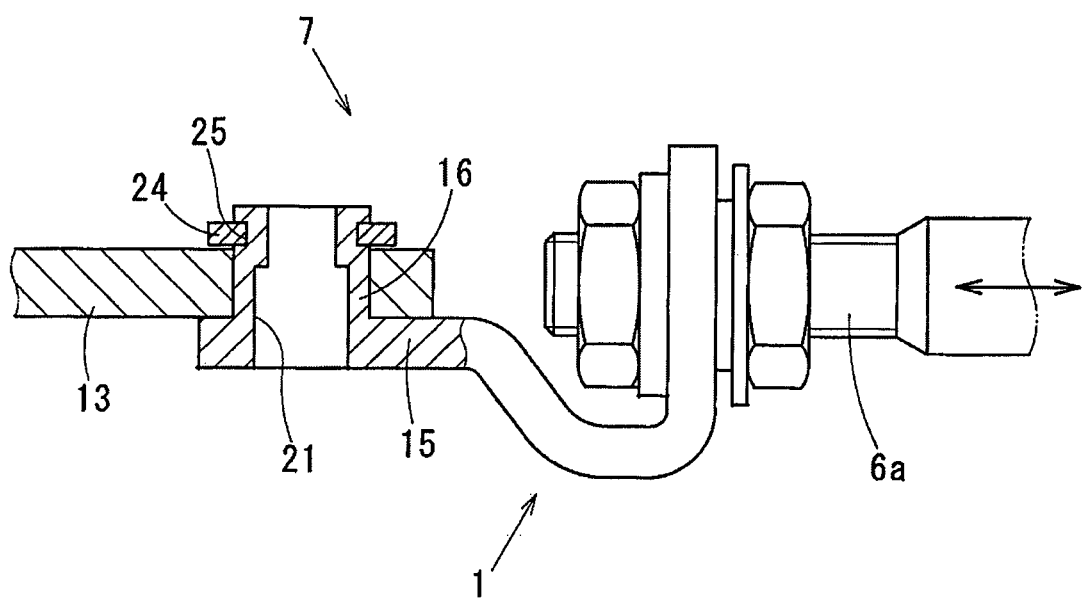
FIG. 10 is a cross-sectional view showing a link between a plate and a rod according to at least one of embodiments.

The plate 1 of the sixth embodiment is a component of a link mechanism 7 in the turbocharger 2 including a direct-drive type actuator 6 similar to that of, for example, WO 2013/042172 A1. As shown in FIG. 10, the plate 1 is an unitary body including a pin and a joint and linking the output shaft 6a of the actuator 6 with a link plate, which is the rod 13.

Another Embodiment

Description will be made mainly on the difference of the plate 1 according to the present embodiment from the plate 1 according to the above embodiment.

Figure 11:
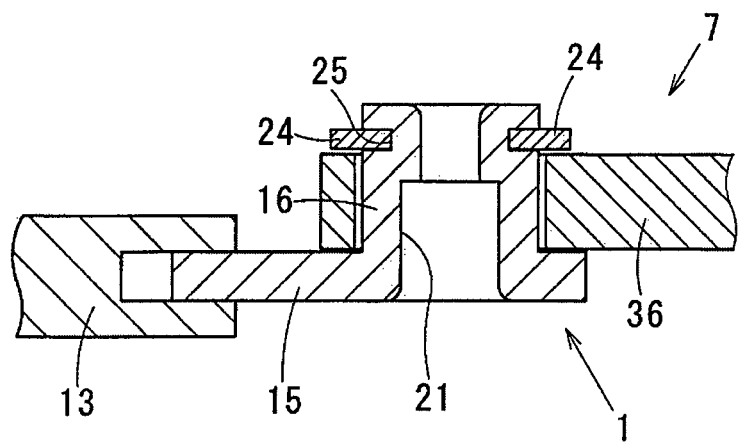
FIG. 11 is a cross-sectional view showing a link between a plate and a rod according to at least one of embodiments.

The plate 1 of the seventh embodiment is a component of a link mechanism 7 in the turbocharger 2 including a direct-drive type actuator 6 similar to that of, for example, JP 2013-540932 A. As shown in FIG. 11, the plate 1 is a connecting element linking the rod 13, which is the output shaft 6a of the actuator 6, with an adjusting lever 36. The plate 1 is an unitary body including a connecting plate and a connecting contour.

Another Embodiment

Various modifications of the present disclosure are conceivable within the scope of the gist.

As described above, the material of the plate 1 of the embodiment is SUS430, and the entirety of the plate 1 is subjected to high temperature nitriding treatment. For example, the material of the plate 1 may be austenitic stainless steel, and the entirety of the plate 1 may be subjected to low temperature carburizing treatment (pionite treatment) or chromizing treatment. The material of the plate 1 may be a steel material having an excellent pressability, and the entirety of the plate 1 may be subjected to functional plating treatment of nickel or chromium after the plate 1 is quenched.

Figure 12:
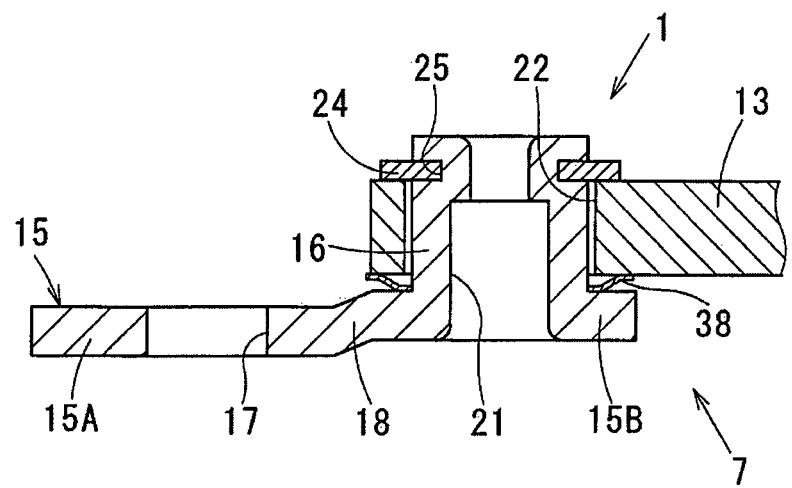
FIG. 12 is a plan view showing a plate according to at least one of embodiments.

According to the plate 1 of the embodiments, the groove 25 is formed on the outer periphery of the pin portion 16, and the component 24 is fitted to the groove 25 for avoiding detachment of the rod 13. As shown in FIG. 12, a tension generating component 38 such as a disc spring or a washer may be assembled to the opposite side of the component 24 to generate tension in the axial direction of the pin portion 16. In this configuration, the component 24 is fitted to the groove 25 thereby to suppress a variation in dimension for adjusting the tension and to enable to stabilize the tension.

Figure 13:
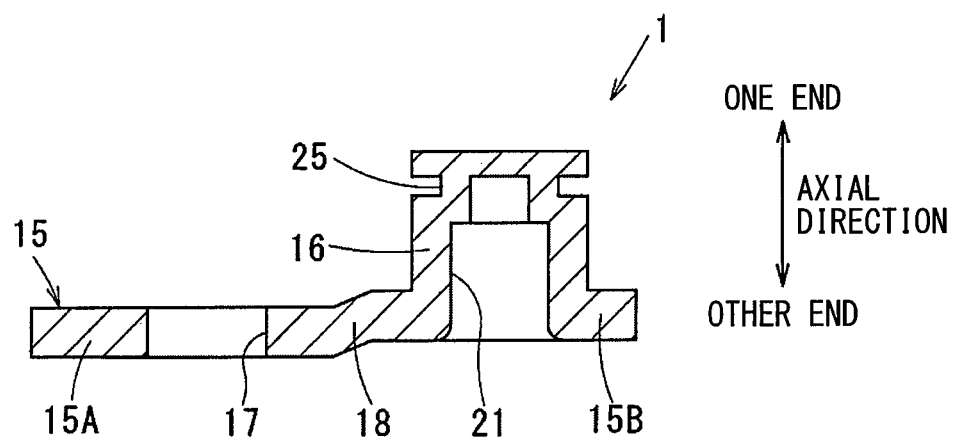
FIG. 13 is a plan view showing a plate according to at least one of embodiments.
Figure 14:
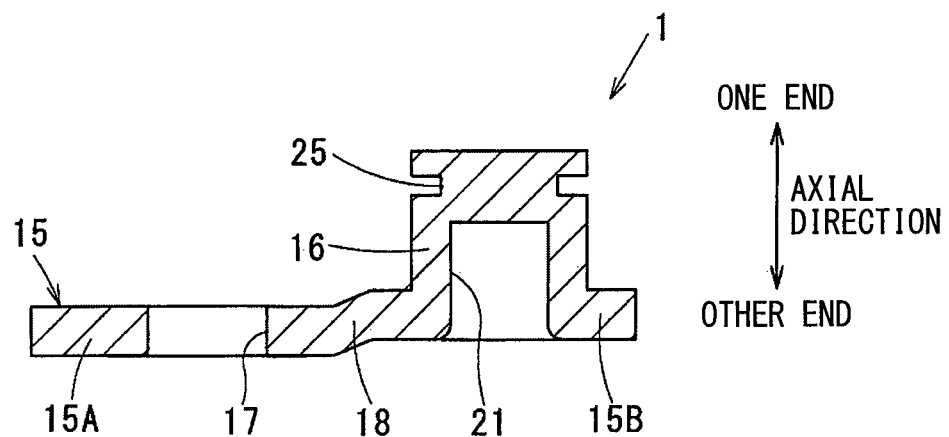
FIG. 14 is a plan view showing a plate according to at least one of embodiments.

In the plate 1 of the embodiments, the hollow portion 21 extends throughout the pin portion 16 and is open to the outside on both the one end side and the other end side in the axial direction of the pin portion 16. The hollow portion 21 also resides on the radially inside of the groove 25. Further various embodiments of the hollow portion 21 are conceivable. For example, the hollow portion 21 may be closed on the one end side and may be extended to the radially inside of the groove 25 (see FIG. 13). The hollow portion 21 may be closed on the one end side not to extend to the radially inside of the groove 25 (see FIG. 14).

In this way, the configuration closes the hollow portion 21 on the one end side, thereby to avoid intrusion of water at the time of wetting and to suppress corrosion. It is conceivable that the pin portion 16 is placed outside more frequently compared with the exhaust turbine 3 and the actuator 6. Therefore, it is effective to close the the hollow portion 21 on the one end side in a case where priority is given to avoidance of water intrusion.

Figure 15:
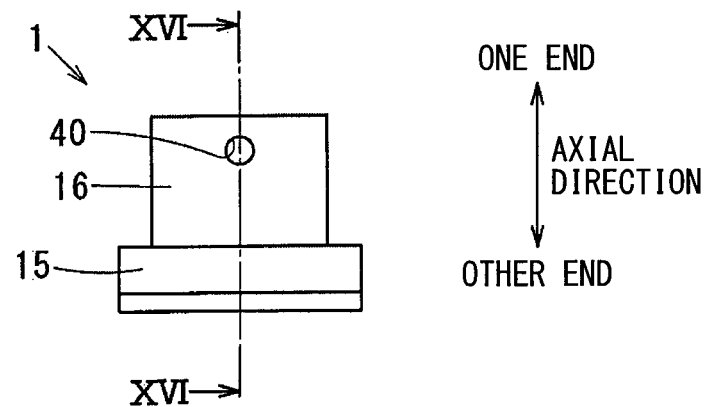
FIG. 15 is a plan view showing a plate according to at least one of embodiments.
Figure 16:
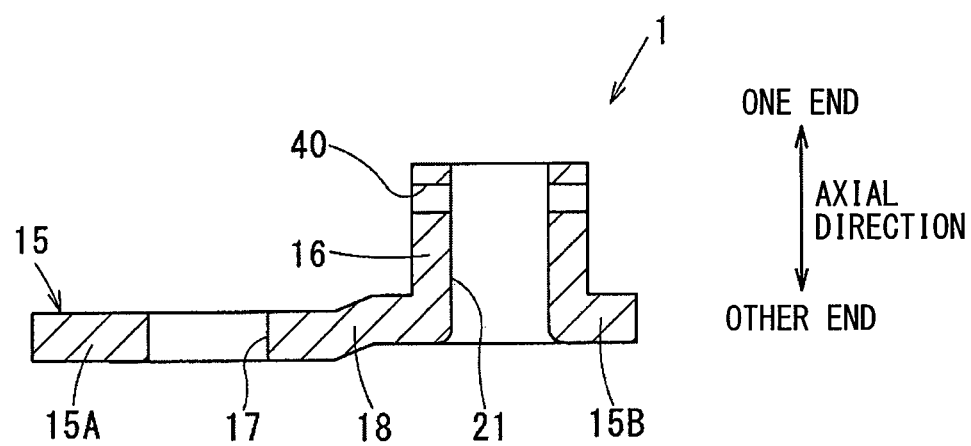
FIG. 16 is a cross-sectional view taken along a line XVI-XVI in FIG. 15 according to at least one of embodiments.

The hollow portion 21 may be opened to the outside at a position other than the one end side and the other end side in the axial direction. For example, a hole 40 may be formed to extend through the pin portion 16 in the radial direction to increase a heat radiation area from the pin portion 16 to the hollow portion 21 (see FIG. 15 and FIG. 16).

According to the plate 1 of the embodiments, the main body portion 15 and the pin portion 16 are integrally formed of the same and serial material not to have a gap and an interface. However, a portion corresponding to the main body portion 15 and a portion corresponding to the pin portion 16 may be prepared as separate components and may be joined into one body by joining or press fitting to form the plate 1.

Although the present disclosure has been described in accordance with the embodiments, it is understood that the present disclosure is not limited to the above embodiments or structures. The present disclosure encompasses various modifications and variations within the scope of equivalents. In addition, while the various combinations and configurations, which are preferred, other combinations and configurations, including more, less or only a single element, are also within the spirit and scope of the present disclosure.

The invention claimed is:

1. A plate for a turbocharger, the turbocharger including
a wastegate valve to be rotationally driven,
an actuator for the wastegate valve, and
a link mechanism linking the wastegate valve with the actuator via a specific rod, the plate being a component of the link mechanism and connecting the wastegate valve with the rod or connecting the rod with the actuator, the plate comprising:
a main body portion in a plate shape; and
a pin portion protruding from the main body portion, wherein
the pin portion is in a tubular shape having a hollow portion opened to its outside,
the pin portion is engageable with an other component, which is a component of the link mechanism, on its outer periphery to form a rotation axis of the other component,
the main body portion and the pin portion are a unitary body in which the main body portion and the pin portion are continuous not to raise neither a gap nor an interface,
the hollow portion is closed on a tip end side of the pin portion without extending through the pin portion, and
the hollow portion opens to the outside on a main body side where the main body portion resides.

2. The plate according to claim 1, wherein
the pin portion protrudes perpendicularly from the main body portion, and
a thickness of the main body portion is larger than a thickness of the pin portion.

3. The plate according to claim 1, wherein
an outer periphery of the pin portion has a groove, to which the other component is engageable, for avoiding detachment of the other component.

4. The plate according to claim 1, wherein
entirety of the plate is subjected to a heat treatment or a surface treatment.

5. The plate according to claim 1, wherein
the main body portion has a hole having an axis parallel to an axis of the pin portion, and
a rotation axis of the wastegate valve or an output shaft of the actuator is engageable to the hole.

6. The plate according to claim 5, wherein
a progressive matching resides on a straight line connecting an axis of the pin portion with an axis of the hole.

7. The plate according to claim 5, wherein
the hole is in a circular shape.

8. The plate according to claim 5, wherein
a rotation stopper resides in the hole.

9. The plate according to claim 1, wherein
the main body portion has a bending step.

10. The plate according to claim 1, wherein
a diameter of a portion of the pin portion, to which the other component is engageable, is larger than a height of entirety of the pin portion.

11. A method for manufacturing the plate of claim 1 the method comprising:
subjecting, in a drawing process, a singular metallic material in a plate shape to a drawing work to form a unitary body in which a tubular portion and a flat plate portion are continuous not to raise neither the gap nor the interface, wherein
the tubular portion corresponds to the pin portion, and
the flat plate portion corresponds to the main body portion.

12. A plate for a turbocharger, the turbocharger including
a wastegate valve to be rotationally driven,
an actuator for the wastegate valve, and
a link mechanism linking the wastegate valve with the actuator via a specific rod, the plate being a component of the link mechanism and connecting the wastegate valve with the rod or connecting the rod with the actuator, the plate comprising:
a main body portion in a plate shape; and
a pin portion protruding from the main body portion, wherein
the pin portion is in a tubular shape having a hollow portion opened to its outside,
the pin portion is engageable with an other component, which is a component of the link mechanism, on its outer periphery to form a rotation axis of the other component,
the main body portion and the pin portion are a unitary body in which the main body portion and the pin portion are continuous not to raise neither a gap nor an interface,
an outer periphery of the pin portion has a groove, to which the other component is engageable, for avoiding detachment of the other component,
two lateral surfaces around the groove includes one lateral surface on a main body side where the main body portion resides, and
the one lateral surface is a tapered surface, in which the closer to its radially outer side, the closer to the main body portion.

13. The plate according to claim 12, wherein
the hollow portion extends through the pin portion and opens to the outside at at least two positions.

14. A method for manufacturing the plate according to claim 12, the method comprising:
subjecting, in a drawing process, a singular metallic material in a plate shape to a drawing work to form a unitary body in which a tubular portion and a flat plate portion are continuous not to raise neither the gap nor the interface, wherein
the tubular portion corresponds to the pin portion,
the flat plate portion corresponds to the main body portion, and
the tubular portion includes the hollow portion which opens on both a tip end side and a flat plate side.

15. A plate for a turbocharger, the turbocharger including
a wastegate valve to be rotationally driven,
an actuator for the wastegate valve, and
a link mechanism linking the wastegate valve with the actuator via a specific rod, the plate being a component of the link mechanism and connecting the wastegate valve with the rod or connecting the rod with the actuator, the plate comprising:

a main body portion in a plate shape; and a pin portion protruding from the main body portion, wherein the pin portion is in a tubular shape having a hollow portion opened to its outside, the pin portion is engageable with an other component, which is a component of the link mechanism, on its outer periphery to form a rotation axis of the other component, the main body portion and the pin portion are a unitary body in which the main body portion and the pin portion are continuous not to raise neither a gap nor an interface, an outer periphery of the pin portion has a groove, to which the other component is engageable, for avoiding detachment of the other component, and as for a diameter of the pin portion, a diameter of a portion on a tip end side relative to the groove is smaller than a diameter of a portion on a main body side where the main body resides.

16. A plate for a turbocharger, the turbocharger including a wastegate valve to be rotationally driven, an actuator for the wastegate valve, and a link mechanism linking the wastegate valve with the actuator via a specific rod, the plate being a component of the link mechanism and connecting the wastegate valve with the rod or connecting the rod with the actuator, the plate comprising:

a main body portion in a plate shape; and a pin portion protruding from the main body portion, wherein the pin portion is in a tubular shape having a hollow portion opened to its outside, the pin portion is engageable with an other component, which is a component of the link mechanism, on its outer periphery to form a rotation axis of the other component, the main body portion and the pin portion are a unitary body in which the main body portion and the pin portion are continuous not to raise neither a gap nor an interface, the hollow portion is closed on a tip end side of the pin portion without extending through the pin portion, the hollow portion opens to the outside on a main body side where the main body portion resides, an outer periphery of the pin portion has a groove, to which the other component is engageable, for avoiding detachment of the other component, the hollow portion resides on an radially inside of the groove, and in the pin portion, a thickness of a portion of the groove portion is the same as a thickness of a portion where the other component is engageable.

17. A plate for a turbocharger, the turbocharger including a wastegate valve to be rotationally driven, an actuator for the wastegate valve, and a link mechanism linking the wastegate valve with the actuator via a specific rod, the plate being a component of the link mechanism and connecting the wastegate valve with the rod or connecting the rod with the actuator, the plate comprising:

a main body portion in a plate shape; and a pin portion protruding from the main body portion, wherein the pin portion is in a tubular shape having a hollow portion opened to its outside, the pin portion is engageable with an other component, which is a component of the link mechanism, on its outer periphery to form a rotation axis of the other component, the main body portion and the pin portion are a unitary body in which the main body portion and the pin portion are continuous not to raise neither a gap nor an interface, the hollow portion is closed on a tip end side of the pin portion without extending through the pin portion, the hollow portion opens to the outside on a main body side where the main body portion resides, an outer periphery of the pin portion has a groove, to which the other component is engageable, for avoiding detachment of the other component, and a tip end surface of the pin portion is tapered so as to facilitate insertion of the pin portion in the other component.

18. A method for manufacturing a plate for a turbocharger, the turbocharger including a wastegate valve to be rotationally driven, an actuator for the wastegate valve, and a link mechanism linking the wastegate valve with the actuator via a specific rod, the plate being a component of the link mechanism and connecting the wastegate valve with the rod or connecting the rod with the actuator, the plate comprising:

a main body portion in a plate shape; and a pin portion protruding from the main body portion, wherein the pin portion is in a tubular shape having a hollow portion opened to its outside, the pin portion is engageable with an other component, which is a component of the link mechanism, on its outer periphery to form a rotation axis of the other component, and the main body portion and the pin portion are a unitary body in which the main body portion and the pin portion are continuous not to raise neither a gap nor an interface, and the method comprising:

subjecting, in a drawing process, a singular metallic material in a plate shape to a drawing work to form a unitary body in which a tubular portion and a flat plate portion are continuous not to raise neither the gap nor the interface, wherein the tubular portion corresponds to the pin portion, the flat plate portion corresponds to the main body portion, the tubular portion includes the hollow portion which opens on both a tip end side and a flat plate side, the outer periphery of the pin portion has a groove, to which the other component is engageable, for avoiding detachment of the other component, a tip end portion of the tubular portion is reduced stepwise in diameter, and a tip end of the tubular portion is made to form the groove.

* * * * *